United States Patent [19]

Luo

[11] Patent Number: 5,430,973
[45] Date of Patent: Jul. 11, 1995

[54] CONFIGURATION OF FLOWER POTS

[76] Inventor: Shih-Lung Luo, 102, Yenping Road, Sec. 3, Sungwu Village, PingChen City, Taoyuan Hsien, Taiwan

[21] Appl. No.: 248,027

[22] Filed: May 24, 1994

[51] Int. Cl.6 .............................................. A01G 9/02
[52] U.S. Cl. ............................................ 47/66; 47/71
[58] Field of Search .......................... 47/66 D, 71, 79

[56] References Cited

U.S. PATENT DOCUMENTS

| 195,094 | 9/1877 | Crowther | 47/66 D |
|---|---|---|---|
| 296,028 | 4/1884 | Martin | 47/71 |
| 1,428,487 | 9/1922 | Loudon | 47/71 |
| 5,309,670 | 5/1994 | Bates | 47/71 |

FOREIGN PATENT DOCUMENTS

| 276343 | 7/1951 | Switzerland | 47/66 D |
|---|---|---|---|
| 361 | 2/1859 | United Kingdom | 47/66 D |
| 2080084 | 2/1982 | United Kingdom | 47/66 D |

Primary Examiner—Michael Powell Buiz
Assistant Examiner—Joanne C. Downs
Attorney, Agent, or Firm—Peterson, Wicks, Nemer & Kamrath

[57] ABSTRACT

The present invention concerns an improvement in the configuration of flower pots, and, more particularly, a flower pot with a novel design for allowing said flower pot to be moved easily for purposes such as allowing the plant to be exposed to more sunlight and facilitating rearrangement. The flower pot pertaining to the present invention is characterized by the fact that the bottom of the flower pot fabricated by molding is equipped with a supporting assembly, that the upper part thereof corresponds to the rim of the bottom of the flower pot, forming a concave unit, that said concave unit is equipped with drain holes of an appropriate size, and that said supporting assembly possesses a water-collection tray that can be drawn out to facilitate the employment thereof.

3 Claims, 3 Drawing Sheets

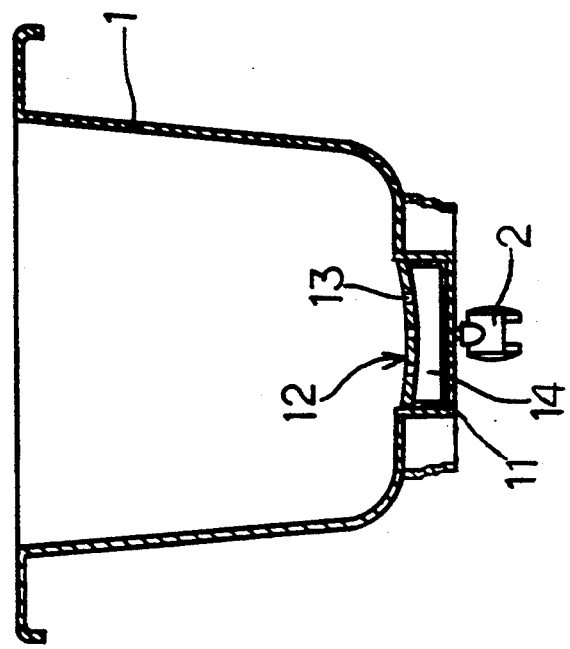

CONFIGURATION OF FLOWER POTS

DESCRIPTION OF THE INVENTION

Background—Field of Invention

The flower pot pertaining to the present invention is equipped with castors and a water-collection tray with which the flower pot can be turned for purposes such as allowing the plant to be exposed to more sunlight and excess water can be removed readily.

Background—Prior Art

People living in cities, who often lack time and opportunities to enjoy nature, like flowers and house plants, because they help relieve the stresses of today's urban living. The popularity of house plants can also be contributed by the fact that the house plant industry has become increasingly sophisticated, resulting in the availability of more varieties of house plants, including some that had been growing only in the wild. Consequently, house plants can be commonly seen in city dwellings, which is desirable in terms of improving urban environment and providing pleasure to people. However, conventional flower pots are typically designed to be stationary, which is problematic in that they cannot be moved readily for purposes such as allowing the plant to be exposed to more sunlight, etc. This problem becomes even more apparent when the plant is large and heavy or the owner is an elderly person with some physical problems. Specifically, conventional flower pots are subject to the following drawbacks that need to be addressed:

1. Conventional flower pots are designed to be stationary, which is problematic in that they cannot be moved readily, particularly when the owner is an elderly person or person with physical handicaps.
2. The fact that conventional flower pots cannot be moved easily also causes house cleaning to be difficult, resulting in an untidy living environment that attracts insects and mosquito.
3. Since conventional flower pots are designed to be stationary, moving them requires effort and time, which is undesirable.
4. Due to limited spaces, it is also difficult for typical households and small shops to rearrange their house plants by employing automatic electric flower pot rollers as an attempt to solve the aforementioned problems pertaining to conventional flower pots.
5. The aforementioned problems pertaining to conventional flower pots become even more severe when the water-collection tray is full. Furthermore, the heavy flower pot has to be moved in order to be able to decant the excess water from the water-collection tray.

Objectives and Merits

The principal objective of the present invention is to present an improvement in the configuration of flower pots, which is characterized by the fact that the bottom of the flower pot fabricated by molding is equipped with a supporting assembly, that the upper part thereof corresponds to the rim of the bottom of the flower pot, forming a concave unit, that said concave unit is equipped with drain holes of an appropriate size, and that said supporting assembly possesses a water-collection tray that can be drawn out to facilitate the employment thereof.

The other principal objective of the present invention is to present an improvement in the configuration of flower pots, which is characterized by the fact that threaded holes of an appropriate size are formed directly at the bottom of the flower pot during the fabrication thereof by injection molding, thereby allowing the installation of screw-in castors or supporting legs to facilitate moving the flower pot and performing housecleaning.

BRIEF DESCRIPTION OF THE FIGURES

FIG. 3: A cross-sectional drawing of a practical example pertaining to the present invention.

BRIEF DESCRIPTION OF THE NOTATIONS

| | | | |
|---|---|---|---|
| 1 | Flower pot | 11 | Supporting assembly |
| 12 | Concave assembly | 13 | Drain hole |
| 14 | Water-collection tray | 15 | Threaded hole |
| 2 | Castor | 21 | Stop |
| 3 | Supporting leg | | |

DETAILED DESCRIPTION OF THE INVENTION

Figure 1:
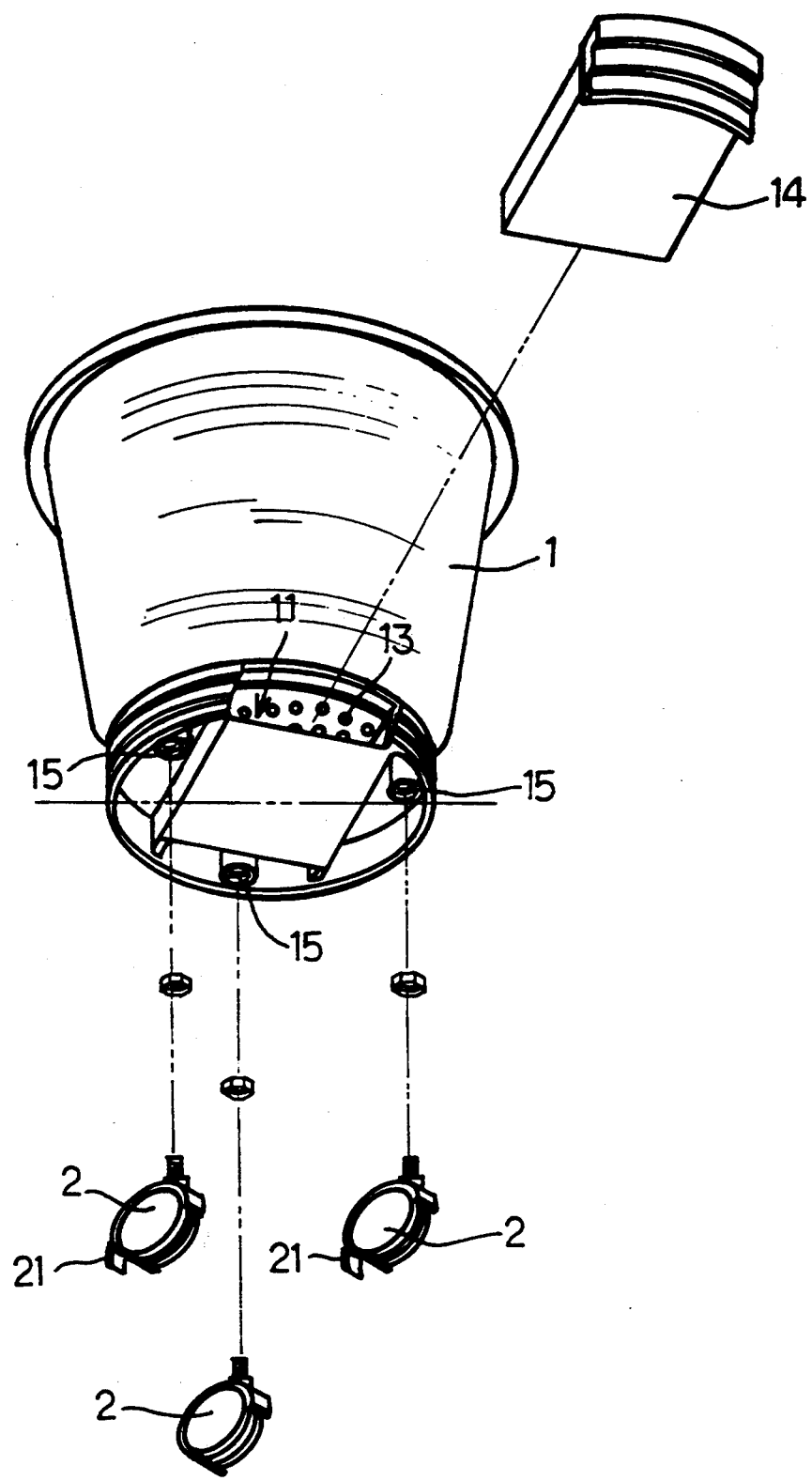
FIG. 1: A three-dimensional dissection drawing of a practical example pertaining to the present invention.
Figure 2:
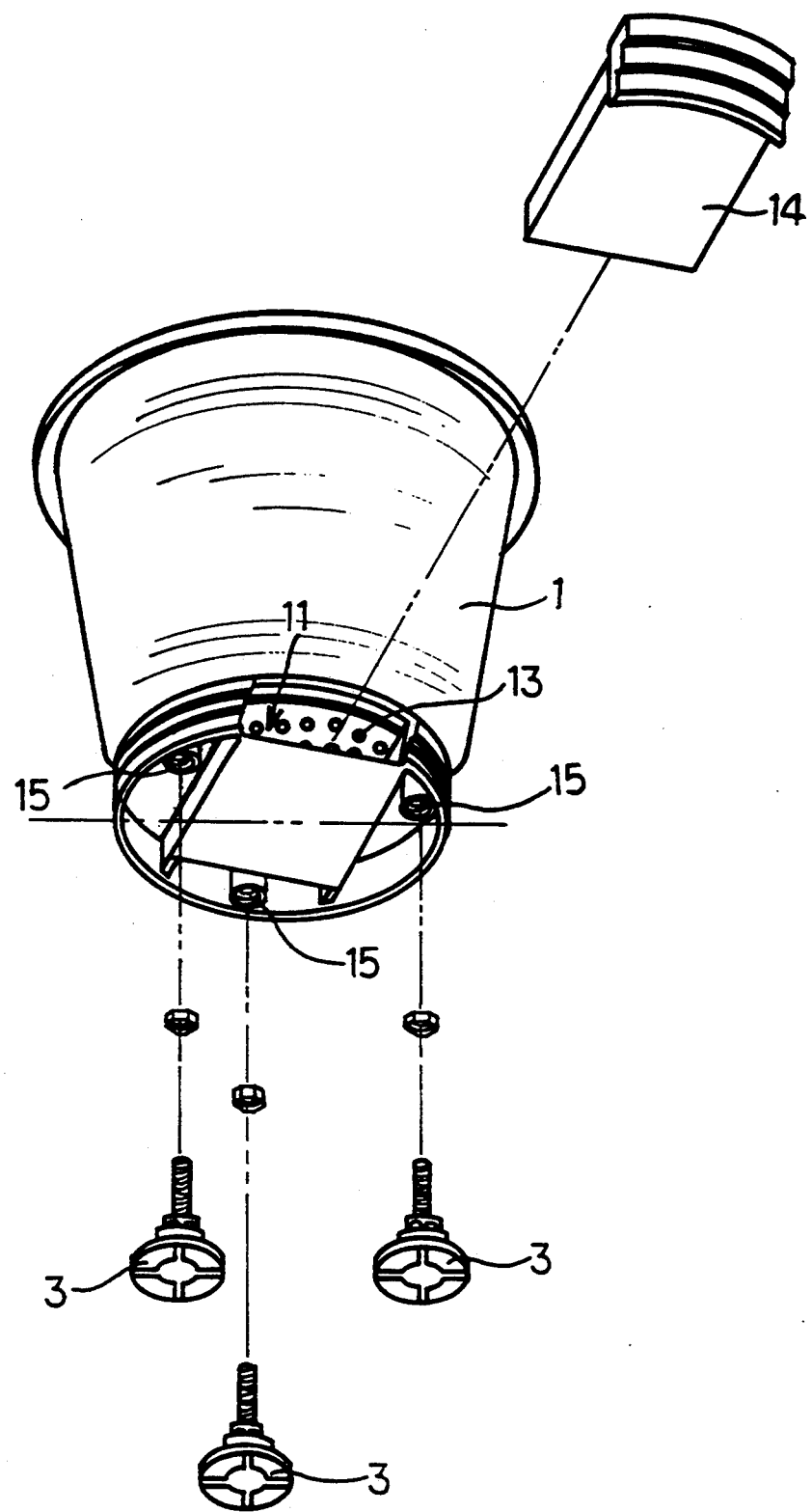
FIG. 2: A three-dimensional dissection drawing of another practical example pertaining to the present invention.

As shown in FIG. 1, the bottom of the flower pot 1 pertaining to the present invention fabricated by molding is equipped with a supporting assembly 11, the upper part thereof corresponds to the rim of the bottom of the flower pot 1, forming a concave unit 12, said concave unit 12 is equipped with drain holes 13 of an appropriate size, and said supporting assembly 11 possesses a water-collection tray 14 that can be drawn out to facilitate the employment thereof. Another practical value of the configuration of the flower pot 1 pertaining to the present invention is that the drain water, which contains fertilizer, in the water-collection tray 14 can be poured back to the flower pot 1 for reusing.

Moreover, threaded holes 15 of an appropriate size are formed directly at the bottom of the flower pot 1 during the fabrication thereof by injection molding, thereby allowing the installation of screw-in castors 2 or supporting legs 3 to facilitate moving the flower pot and performing housecleaning. In addition, the castor 2 can be equipped with a stop 21, thereby allowing the flower pot to become stationary. Accordingly, the objectives of the present invention, which is novel and possesses practical values, are achieved.

In summary, the present invention possesses the following merits:

1. The flower pot pertaining to the present invention can be moved readily and without efforts. Even an elderly person or person with physical handicaps can manage moving said flower pot.
2. The fact that the flower pot pertaining to the present invention can be moved easily facilitates housecleaning, thereby promoting a tidy living environment that does not attract insects and mosquito.
3. The flower pot pertaining to the present invention, which can be rearranged easily with minimal efforts, is particularly suitable for use in typical households and small shops.

4. Due to space limitation and cost, it is difficult for typical households and small shops to rearrange their house plants by employing automatic electric flower pot rollers as an attempt to solve the aforementioned problems pertaining to conventional flower pots. The problems relating to space limitation and cost can be solved by using the flower pot pertaining to the present invention.

5. The water-collection tray pertaining to the present invention, which is placed in a supporting assembly formed during the fabrication of the flower pot by molding, can be drawn out to facilitate the employment of said tray, with which excess water can be removed quickly with minimal efforts.

The preceding description illustrates the principal features of the present invention. However, the present invention is not defined by the above description alone, but by the scope of the appended claim.

I claim:

1. A flower pot comprising:

a body including a bottom portion having a concave surface formed therein, a plurality of drain holes formed in said concave surface, a supporting assembly secured to said bottom portion of said body and arranged below said concave surface of said bottom portion, said supporting assembly including a channel means formed therein, a water-collection tray slidably engaged in said channel means and arranged below said drain holes of said concave surface for collecting water flowing through said drain holes, and means for supporting said body and said supporting assembly.

2. A flower pot according to claim 1, wherein said supporting means includes at least three wheels secured to said bottom portion of said body.

3. A flower pot according to claim 1, wherein said supporting means includes at least three legs secured to said bottom portion of said body.

* * * * *